Patented Feb. 8, 1927.

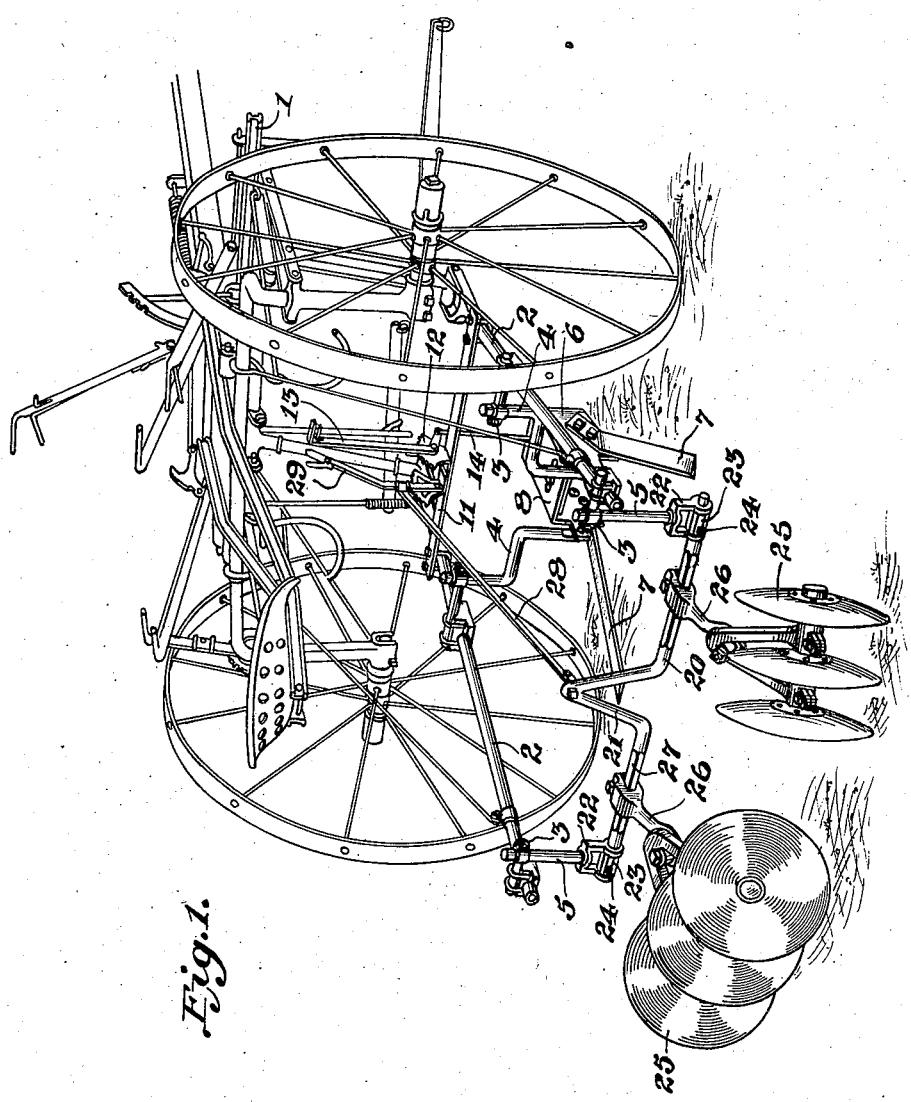

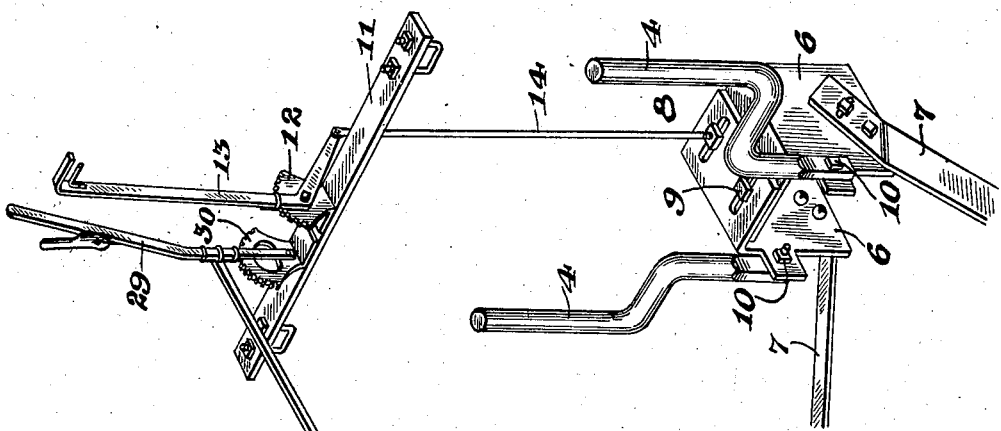

1,617,029

UNITED STATES PATENT OFFICE.

AUCTIV C. RIPPY, OF AMARILLO, TEXAS.

CULTIVATOR ATTACHMENT.

Application filed September 22, 1925. Serial No. 57,918.

This invention relates to an attachment for cultivators and has for its object to provide a comparatively simple and inexpensive device by means of which the ordinary wheeled cultivator may be readily converted into a lister corn cultivator or go-devil; thereby avoiding the expense of two machines, one for listed crops and the other for ordinary crops.

More specifically my invention contemplates the construction of an attachment which may be secured to an ordinary wheeled cultivator by the clamps provided for holding the plows, and which has all of the functions of a lister corn cultivator or go-devil.

Other objects and advantages of the invention will be apparent from the following description when taken in connection with the accompanying drawings, in which:

Figure 1 is a perspective view of the ordinary wheeled cultivator having my attachment in place thereon in lieu of the plows.

Figure 2 is a perspective view of the attachment per se, and

Figure 3 is a detail view of the attaching clamp.

Referring to the drawings more in detail the numeral 1 indicates generally any well-known type of wheeled cultivator which is provided with a pair of gang beams 2 for the attachment of the cultivator plows (not shown).

In the present conception of the invention the plows have been removed from the clamps 3 to which they are ordinarily attached and in their place is secured the mechanism by which the cultivator is converted into a go-devil, and which will now be described in detail.

Four uprights or arms 4—4 and 5—5 are provided and are adapted to be adjustably secured in the clamp 3 of the cultivator after the plows have been removed. The forward arms 4 form supports for the usual guards or fenders 6 and to which are attached knives 7 for cutting back the vegetation along the rows. These guard plates are provided with overhanging flanges 8 which are adjustably connected by means of bolts 9, and which are pivotally connected as indicated by numeral 10 to the lower ends of the arms 4. It will thus be apparent that the arms 4 may be laterally adjusted to accommodate the attachment to cultivators of varying sizes and types, and that due to the pivot points 10 the same may be vertically adjusted to vary the depth of cut of the knives 7. For the purpose of accomplishing this vertical adjustment of the guards 6 and knives 7 I have provided a plate 11 which is attached to the forward ends of the gang beams of the cultivator frame as shown in Figure 1, and forms a support for the toothed segment 12 and hand lever 13 which is pivoted thereto. Pivotally connected to the free end of the lever 13 which is of the bell-crank type is a link 14 which has its lower end attached to the flanges 8 of the guard plates 6. It will thus be apparent that as the lever 13 is adjusted on its pivot the knives 7 may be raised or lowered as desired.

The present invention also contemplates the use of the discs usually found on go-devils or lister cultivators, and to this end the arms 5 form supports or bearings for a shaft 20 provided with a crank 21. The ends of the shaft 20 are rotatably mounted in the bearings 22 and are longitudinally adjustable with respect thereto by means of the sleeves 23 and set screws 24. These adjustments function in the same manner as the flanges 8 to permit the attachment to be readily installed on wheeled cultivators of varying sizes and types. The discs 25 are mounted on the usual arms 26 which are rigidly clamped to the squared portions 27 of the shaft 20. Vertical adjustments of the discs 25 are secured by means of the connecting rod 28 which has one end attached to the crank 21 and the other end to the hand lever 29 which is also pivoted on the plate 11. This lever cooperates with a toothed segment 30 and permits manual adjustment of the discs 25 to the extent desired.

In Figure 1 of the drawings the plows have been removed and the attachment substituted therefor and ready for use. Obviously, the machine as disclosed in Figure 1 may be used in all places where the go-devil or lister cultivator is employed and in addition it may be equally well employed after the furrows are filled in to a level since this improved machine does not rely on a furrow for guidance as does the ordinary go-devil or lister cultivator.

From the foregoing description taken in connection with the accompanying drawings it will be observed that I have devised an attachment by which a wheeled cultivator may be readily converted into a go-devil or lister cultivator by the ordinary farm hand without the use of special tools; that such converted machine has several advantages over the ordinary go-devil; and that the machine may with equal facility be reconverted into the conventional wheeled cultivator.

In accordance with the patent statutes I have described what I now believe to be the best embodiment of the invention, but I do not wish to be understood thereby as limiting myself of the scope of the invention, as many changes and modifications may be made without departing from the spirit of the invention; all such I aim to include in the scope of the appended claims.

What I claim as new and desire to secure by Letters Patent is:

1. An attachment for converting an ordinary cultivator having gang beams into a lister cultivator, including arms adapted to be secured to the usual plow clamps at the forward end of the beams, knives adjustably associated with said arms, other arms adapted to be secured to the plow clamps at the rear end of the beams, discs adjustably associated with said last-named arms, a plate adapted to be secured to the cultivator frame, and means on said plate operatively connected with said knives and discs for adjusting the same.

2. An attachment for converting an ordinary cultivator having gang beams into a lister cultivator, including arms adapted to be secured to the usual plow clamps at the forward end of the beams, guard plates pivoted on said arms, means for permitting relative adjustment of said plates, laterally extending knives secured to the plates, other arms adapted to be secured to the plow clamps at the rear end of the beams, tools associated with said last-named arms, a plate adapted to be secured to the cultivator frame, and means on said plate operatively connected with said knives and tools for adjusting the same.

AUCTIV C. RIPPY.